United States Patent [19]
Shoji et al.

[11] Patent Number: 5,757,381
[45] Date of Patent: May 26, 1998

[54] METHODS FOR FAST SCROLLING OF IMAGES

[75] Inventors: Wataru Shoji; Daisuke Tabuchi; Ichiro Nakajima, all of Tokyo, Japan

[73] Assignee: Sofmap Future Design, Inc., Tokyo, Japan

[21] Appl. No.: 628,043

[22] Filed: Apr. 4, 1996

[51] Int. Cl.$^6$ ................................................ G06F 15/00
[52] U.S. Cl. .................................................... 345/438
[58] Field of Search ........................ 395/138, 134, 395/135, 133; 345/118, 121

[56] References Cited

U.S. PATENT DOCUMENTS 5,659,672  8/1997  Yutaka et al. ............................ 395/130

FOREIGN PATENT DOCUMENTS

| 0474234-A2 | 3/1992 | European Pat. Off. |
| 0528631 A2 | 2/1993 | European Pat. Off. |
| 0550812 A1 | 7/1993 | European Pat. Off. |
| 4-116692 | 4/1992 | Japan |

OTHER PUBLICATIONS

Displays, Technology and Applications, *Analysis of the raster-based 2D vector graphics systems*, F. R. Belch, Apr. 1987, pp. 87–97.

IBM Technical Disclosure Bulletin, *Mouse Assisted Scrolling Function For Multimedia Displays*, Dec. 1994, vol. 37, No. 12, pp. 495–496.

Primary Examiner—Phu K. Nguyen
Attorney, Agent, or Firm—H. C. Chan

[57] ABSTRACT

Fast scrolling of images can be achieved by drawing only the portions that are changed as a result of scrolling. Because there is no need to draw the whole image during scrolling, the scrolling speed can be increased. This method can be applied to bitmap and vector images. A high speed data transfer device can also be used to further increase scrolling speed. This device comprises two memory buffers, a first circuit for communicating data with a hard disk, and a second circuit for communicating data with system memory. The device also comprises a data switching circuit which alternative couples the first circuit to one of the two buffers and alternatively couples the second circuit to the remaining one of the two buffers. As a result, graphic data can be continuously transfer between the hard disk and system memory. Consequently, scrolling can be performed without slowed down by data transfer.

7 Claims, 8 Drawing Sheets

METHODS FOR FAST SCROLLING OF IMAGES

FIELD OF THE INVENTION

The present invention relates to display of images using a computer, and more particularly to methods and apparatus for increasing the speed of scrolling images displayed on a computer monitor.

BACKGROUND OF THE INVENTION

When computers were first developed, they were very expensive. As a result, only large research institutions and corporations could afford to buy them. Consequently, computers were primarily being used to solve scientific problems (e.g., simulating the behavior of fluid) and support business operations of large corporations (e.g., processing accounting and customer records of insurance companies). The software programs designed for these purposes communicate with users using numbers and text. The users of these software programs were technically trained, and were comfortable in such environment. Thus, there were little needs for these program to present information in graphic or image forms.

During the past few years, the price of computers decreased drastically. Computers are now purchased by many homes and small businesses. The users are more comfortable in dealing with graphic images (such as bitmap images, vector images and video). As a result, computer environments involving graphic user interface (such as Microsoft Corporation's Windows and Macintosh computer's System 7 operating system) become popular. Consequently, most new computer programs are designed to operate in these environments. For example, many widely used word processor programs have been ported from their text-based environment (operating under Microsoft's MS-DOS) to the graphic-based Windows environment. One advantage of using word processor under this new environment is that the image of a page on a computer monitor has the same appearance as the page printed out of a printer. Thus, the user can see the appearance of a document (and make revisions if the appearance needs to be changed) prior to its printing.

An essential tool in manipulating graphic images is scrolling. The need for scrolling arises when the size of a window displaying a graphic image is smaller than the full size of the image. Thus, the window can display a portion of the image only. In order to display other portions of the image, a user can "scroll" the image. Typically, the user uses a cursor to indicate the direction of scrolling. The position of the cursor is controlled by a mouse (or other pointing devices) held by the user. The location of the cursor is delivered to the operating system and the application software (e.g., word processor program) controlling the graphic image. The images on most display devices need to be refreshed (i.e., re-drawn) periodically, e.g., sixty times per second. During scrolling, the refreshed images would show a series of shifted images depicting movements of the graphic file. The operating system and the application software use the position of the cursor to determine how the series of images should be drawn. If the operating system and the application software cannot draw these images efficiently, it may take an intolerably long time for the series of images to appear (i.e., the scrolling is slow). The user may become impatient, and will be less incline to use the computer or software.

One method to speed up scrolling is to install a more powerful microprocessor in a computer. Another method is to use specialized semiconductor chips (e.g., "graphic accelerator" chips) which are designed to optimize graphic computations. These methods increase the throughput of all graphic operations, and are not specifically designed to improve the speed of scrolling.

In some graphic applications, the speed of scrolling is an important factor limiting the performance of a computer system. The above described prior art methods may not provide a cost effective solution to this problem. Further, when the graphic file is large and the application is complex, even the most powerful microcomputer and the fastest graphic accelerator may not be able to provide acceptable performance without additional help. Thus, there is a need to have a method which is specifically designed to increase the speed of scrolling.

SUMMARY OF THE INVENTION

The present invention involves novel methods and systems for fast scrolling of images in a window displayed on a computer monitor. One aspect of the present invention is the realization that there is no need to construct the whole image every time when an image is refreshed during scrolling. Instead, only the portions which are different need to be changed. In most cases, the changed portion is a small fraction of the displayed image. Because only a small portion of the images need to be processed at each refresh, the amount of computer resources used in scrolling operation could be very small.

In one embodiment of the present invention, a bitmap graphic file is scrolled in response to positions of a cursor. An image is generated on a display device when a portion of the graphic data in the file is written into a predetermined area of a semiconductor memory device (e.g., a display random access memory, or display RAM, such as a video RAM, or VRAM) in a computer system. Scrolling involves displaying a first image containing a first portion of the graphic file at a first time and a second image containing a second portion of the graphic file at a second time. The separation between the first and second portions is determined by the cursor. In drawing the second image, the system first determines a common portion of the graphic file which is common to the first and second portions. Assuming that at the first time the common portion is located at a first region of the memory device, this common portion is then moved from the first region to a second region inside the predetermined area of the memory device. The location of this second region is defined by the direction and speed of scrolling (as determined by the position of the cursor). A new portion of the graphic file (comprises a portion of the graphic file which is in the second portion but not in the first portion) is then written into a third region of the memory device such that the second and the third regions occupy the predetermined area of the memory device. As a result, the display device now displays a new image which is one of a series of images resulting from scrolling.

In a second embodiment of the present invention, a vector graphic file is scrolled in response to positions of a cursor. In a vector graphic file, images are generated by drawing a plurality of shapes each associated with a vector command. At least one of the vector commands contains a set of parameters used in the scrolling operation of the present invention. The parameters correspond to the coordinates of an imaginary polygon enclosing the shape associated with the vector command. These parameters are used to determine whether this vector command needs to be evaluated during scrolling. In the present invention, the word "polygon" includes a square, rectangle, or other shapes bounded by straight lines.

Similar to the first embodiment, an image is generated on a display device when a portion of the graphic data is written into a predetermined area of a display random access memory in a computer system. Scrolling involves displaying a first image containing a first portion of the graphic file at a first time and a second image containing a second portion of the graphic file at a second time. The separation between the first and second portions is determined by the cursor. A new portion of the graphic file will then be determined. This new portion needs to be loaded to the predetermined area of the memory device in order to generate the second image. The set of coordinate parameters is used to determine whether a portion of the enclosing polygon falls within the new portion of graphic file. The vector command needs to be evaluated or expanded (i.e., drawing a shape based on the command) only if at least a portion of the polygon falls within the new portion.

In this embodiment, the common portion of the graphic file (described in the first embodiment) is also determined. This common portion is moved from one region of the display RAM to anther region. Shapes fall completely within the common portion do not need to be evaluated. In many cases, the size of the new portion is a fraction of the common portion. As a result, the amount of computation is reduced.

In a third embodiment of the present invention, a bitmap image is superimposed on a vector image (i.e., both images are displayed in the same window). These two images can be scrolled simultaneously by moving a cursor. In this embodiment, each image is scrolled by using the methods disclosed above in the first and the second embodiments. The direction and speed of scrolling of these images are closely related because they are determined by the same cursor. Because of the improved speed of scrolling by using the methods of the present invention, the simultaneous scrolling can be easily carried out with little reduction in performance.

Typically, a graphic file is a very large file (many million bytes) which needs to be stored in a hard disk. As a result of scrolling, it may be necessary to transfer data from a disk drive to the computer. The present invention also involves a novel high speed data transfer device which allows fast transfer of data between an external memory device (such as a hard disk) and internal memory of a computer (e.g., system RAM and video RAM). The high speed data transfer device comprises a first memory, a second memory, a first circuit for communicating data with the external memory device, and a second circuit for communicating data with the internal memory. The device also comprises a data switching circuit which alternative couples the first circuit to one of the first and second memories and alternatively couples the second circuit to the remaining one of the first and second memories. When the first circuit is coupled to the first or second memory, data is transferred between the external memory device to the first or second memory, respectively. When the second circuit is coupled to the first or second memory, data is transferred between the internal memory and the first or second memory, respectively.

One of the advantages of the above data transfer device is that the first and second circuits can perform different data transfer operation concurrently. For example, the external memory device can transfer data to the first memory while the internal memory can transfer data from the second memory. In a preferred embodiment, the first memory, the second memory and the internal memory are semiconductor devices while the external memory device is a mechanical device. As a result, the time for transferring data from the first or second memory to the internal memory is shorter than the time for transferring data from the external memory device to the first or second memory. Thus, the memory in the data transfer device connected to the internal memory would be available to receive data before the memory in the data transfer device connected to the external memory device is full. As a result, data can be transferred between the external memory device and the internal memory almost continuously.

The external memory device is controlled by the data transfer device of the present invention. Thus, the CPU of the computer would not be used for data transfer controlling the external memory device. CPU cycles may be used to transfer data from the first or second memory to the internal memory. As pointed out above, this time is very short. Thus, only a small number of CPU cycles are used. One aspect of the present invention is a method for allowing scrolling images to be updated during the period of time when the CPU is not used for data transfer.

The data transfer device further comprises means for generate status signals related to the operation of the data switching circuit. The status signal could indicate that new graphic data is retrieved from the external memory device and loaded into the internal memory. A software driver responsive to the status signal can cause the CPU to update the scrolling images using the newly retrieved graphic data. As discussed above, scrolling operation may take up a small amount of CPU resource. Consequently, the software driver also allows other software programs to run during the time period when CPU cycles are not used for data transfer and scrolling. As a result, the CPU does not have to sit idle.

These and other features and advantages can be understood from the following detailed description of the invention together with the accompanying drawings.

DETAIL DESCRIPTION OF THE INVENTION

The present invention is directed to novel methods and systems for fast scrolling of images in a window. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
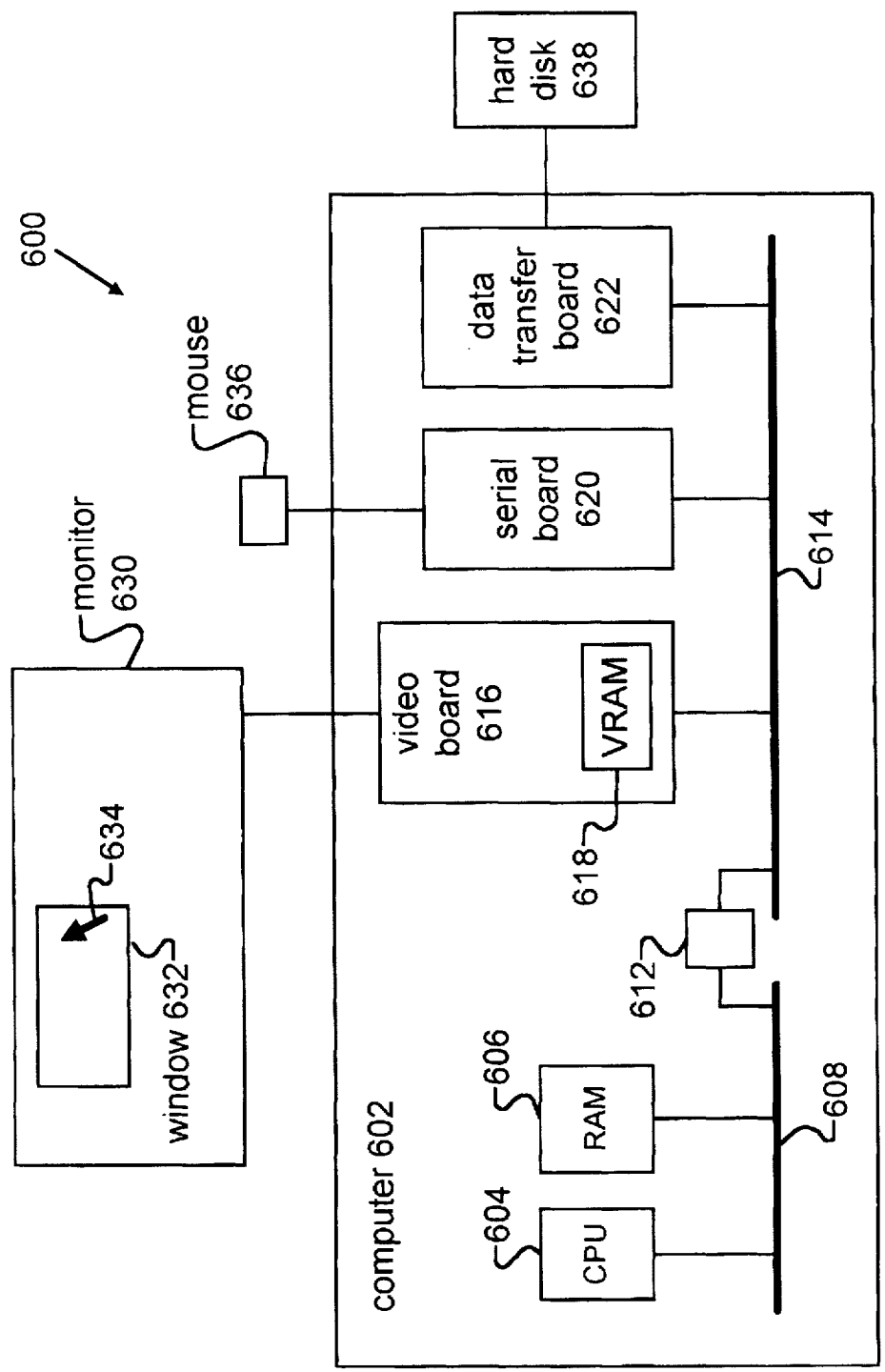
FIG. 1 is a block diagram of a computer system of the present invention.

FIG. 1 is a block diagram of a computer system 600 of the present invention which is capable of performing fast scrolling. Computer system 600 comprises a computer 602 having a central processing unit (CPU) 604 and system random access memory (RAM) 606 coupled to a system bus 608. Computer 602 also contains a peripheral bus controller 612 for controlling a peripheral bus 614. Depending on the architecture of computer 602, peripheral bus 614 could be a PCI bus, VESI local bus, ISA bus, or other similar buses. Peripheral bus 614 allows peripheral boards to be connected to computer 602. Examples of peripheral boards are a video board 616, a serial board 620 and a data transfer board 622. CPU 604 and RAM 606 can communicate with the peripheral boards through peripheral bus controller 612.

Serial board 620 allows serial communication between computer 602 and one or more external serial devices, such as a mouse 636.

Video board 616 contains circuits to control a monitor 630 and display images thereon. Video board 616 also contains memory 618 associated with such display. The memory is preferably a special kind of memory integrated circuit device, called VRAM, designed for video applications. The circuits draws images on monitor 630 based on information stored in memory 618. The images on monitor 630 are updated at predetermined time intervals. This intervals could be determined by the refresh rate of monitor 630 (e.g., sixty times a second).

If computer system 600 is used to run programs in a windows-based environment, one or more windows, such as a window 632, could be displayed on monitor 630. A cursor 634 could be positioned inside window 632. The position of cursor 634 is preferably controlled by mouse 636. As explained below, if window 632 displays an image (generated by bitmap or vector files), cursor 634 could be used to scroll the image. In this embodiment, the orientation and distance of cursor from the center of window 632 determine the direction and speed of scrolling.

Data transfer board 622 is connected to a hard disk 638. Graphic data (in bitmap or vector forms) intended to be displayed on monitor 630 is stored in hard disk 638. Data transfer board 622 contains circuits which allow fast transferring of data from and to hard disk 638. The data is transformed (e.g., evaluate vector commands) by computer 602 in a form that could be displayed in window 632. As the image in window 632 is scrolled, graphic data corresponding to the image may need to be retrieved from hard disk 638.

In the present invention, two approaches are used to increase the speed of scrolling in window 632. The first approach is a new algorithm for fast composition of the image to be displayed. The second approach is a new design for data transfer board 632 which allows fast retrieval of graphic data from hard disk 638. These two approaches work synergically to achieve fast scrolling. These approaches will be discussed below in detail.

Figure 2A:
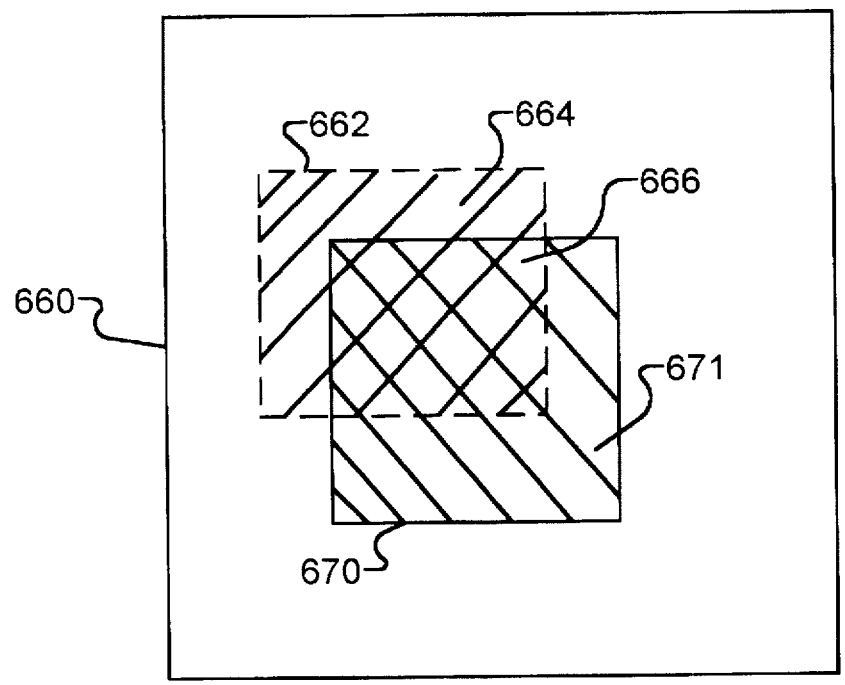
FIGS. 2A–2C shows the relationship between a new image and an old image as a result of scrolling.

FIG. 2A is a drawing showing the relationship between a new image and an old image in window 632 as a result of scrolling. In FIG. 2A, rectangle 660 is used to indicate the boundary of the complete image. When the size of the complete image is larger than the size of display window 632, only a portion of the complete image is displayed in window 632 at one time. A rectangle 662, shown in dashed perimeter, is used to represent the old image. It contains a portion 664 having hatched lines drawn in a single direction and a portion 666 having hatched lines in two directions. A rectangle 670, shown in solid perimeter, is used to represent the new image resulting from scrolling. It contains portion 666 and a portion 671 having hatched lines drawn in a direction 90 degree different from the hatched lines in portion 664. It should be noted that portion 666 is common to the old and the new images.

Figure 2B:
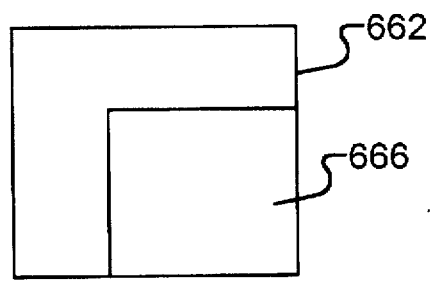
Figure 2C:
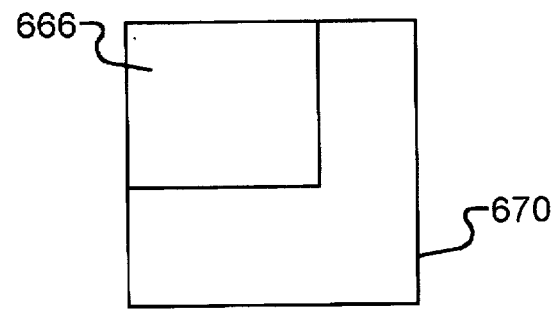

In order to better understand the effect of scrolling. FIG. 2B shows the position of common portion 666 in the old image 662 and FIG. 2C shows the position of portion 666 in new image 670. Thus, prior to scrolling, portion 666 is located at the lower right hand corner of the window. After scrolling, portion 666 is moved to the upper left hand corner of the window. Because the images are stored in VRAM 618, the bits therein corresponding to portion 666 need to be moved accordingly.

Returning to FIG. 2A, the content of common portion 666 is common to both the new and old images. One way to construct the new image from the old image is to add portion 671 to, and remove portion 664 from, the old image. The bits in portion 666 do not need to be changed, although portion 666 needs to be moved from one position to another in VRAM 618.

The following are the steps involved in scrolling: (1) The bits in VRAM 618 corresponding to portion 666 are moved to their new position. The movement of the bits can be controlled by CPU 604 or specialized chips (not shown) in video board 616. Many VRAMs accept "block write" commands allowing data to be written into a block of memory registers in the VRAM. These commands may be used advantageously in the present invention. (2) Bits corresponding to portion 671 are added to the appropriate locations in VRAM 618 to complete the image. These two steps are repeated every time when the image on video board 616 is refreshed.

Figure 2D:
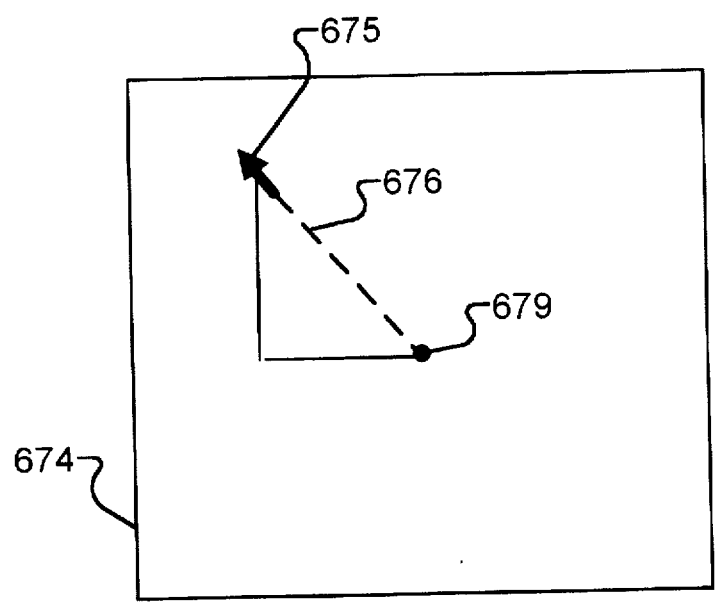
FIG. 2D shows the position of a cursor used to determine the direction of scrolling of the present invention.

FIG. 2D shows a window 674 containing an image (not shown) to be scrolled. A cursor 675 is position inside window 674. Window 674 and cursor 675 correspond to window 632 and cursor 634 of FIG. 1. In one embodiment of the present invention, the direction of cursor 675 relative to the center 679 of window 674 is used to define the direction of scrolling. The distance 676 between cursor 675 and center 679 may be used to define the speed of scrolling. It should be noted that other points in window 674 (instead of center 679) could be used as the reference point.

It should be appreciated that the invention can be used to display both raster (i.e., bitmap) and vector data. It is well known that the vector data needs to be expanded or evaluated (i.e., generating shapes based on vector commands) prior to being displayed on monitor 630. In this invention, only vector data corresponding to portion 671 needs to be expanded during scrolling. The vector data corresponding to common portion 666 does not have to be expanded again.

The application of the present invention to vector data is now described. Conventional vector data represents an image as a collection of lines or shapes (e.g., square, circle, etc.). Vector data is typically presented in the form of commands in ASCII characters. An example of a vector command is:

OVAL x, y, $r_1$, $r_2$ [other parameters];

where x and y are the coordinates of the center of the oval and $r_1$ and $r_2$ are the major and minor radii of the oval. The "other parameters" could include color, types of line (e.g., solid or dashed), etc.

Figure 2E:
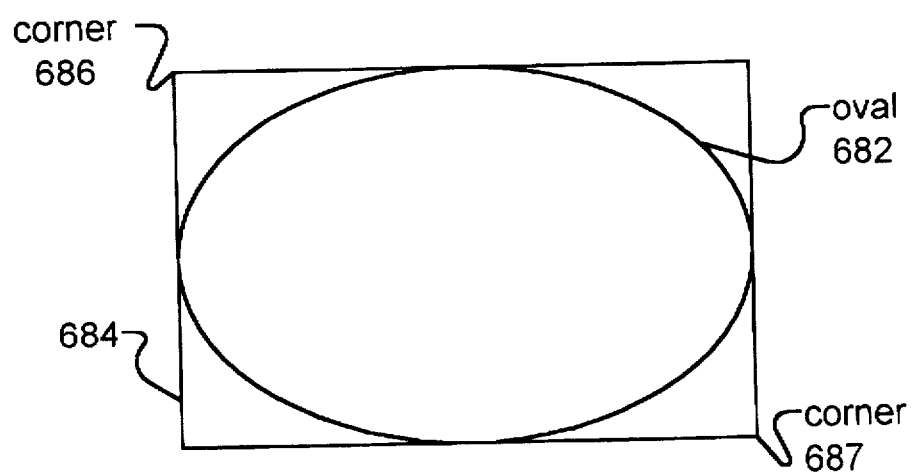
FIG. 2E shows the generation of extra coordinates related to vector data of the present invention.

One aspect of the present invention is to add parameters to the vector commands so as to indicate whether a command needs to be expanded when only a portion of an image generated from vector commands is displayed on a monitor. FIG. 2E shows an oval 682 expanded from the above mentioned "OVAL" vector command. Oval 682 is enclosed by an imaginary rectangle 684. The position and dimension of the rectangle is completely defined by two points 686 and 687 having coordinates ($P_1$, $Q_1$) and ($P_2$, $Q_2$). In the vector data of the present invention, these extra coordinates are added to the list of parameters. Thus, the above vector command would be changed to:

OVAL x, y, $r_1$, $r_2$, $P_1$, $Q_1$, $P_2$, $Q_2$, [other parameters].

Other imaginary shapes could be used to enclose the actual shapes of the image. For example, a square is preferably used to enclose a circle. In general, a polygon (i.e., a shape bounded by a plurality of straight lines) can be used. In this case, the coordinates of the corners of the polygon can be added to the list of parameters.

Returning now to FIG. 2A, portion 671 needs to be added to portion 666 in order to create the scrolled image. The bits in VRAM 618 corresponding to portion 666 are moved to their new position. All the vector commands are examined to determine whether the enclosing polygon falls within portion 671. This step can be performed easily by determining (i) the coordinates of points which falls within a polygon defined by the extra coordinates, and (ii) whether any of these points fall within portion 671. Only those vector commands having at least a portion of their enclosing polygons fall within portion 671 need to be evaluated in order to create the scrolled image. There is no need to evaluate the rest of the vector commands. As a result, the amount of computation for generating images is greatly reduced.

The above described methods to handle bitmap and vector data can be applied to the case where window 632 of FIG. 1 is used to simultaneously displaying a bitmap and a vector image, i.e., the same window contains an image generated from bitmap data and an image generated from vector data). In simultaneously displaying, a first image (e.g., a bitmap image) is loaded into VRAM 618 and a second image (e.g., a vector image) is then loaded into memory 618. Portions of the first and second images may overlap. Thus, one image may appear to be located on top of the other image. When window 632 is scrolled, portion 671 corresponding to both the bitmap and vector images are added to portion 666 of the bitmap and vector images.

Implementing the Above Described Scrolling Methods in a Computer System Having a Novel Data Transferring Device The scrolling methods of the present invention can be implemented on computer system 600 of FIG. 1 using a novel data transfer device. In this implementation, data transfer board 622 and hard disk 638 of computer system 600 are new, and will be described below in detail.

Figure 3:
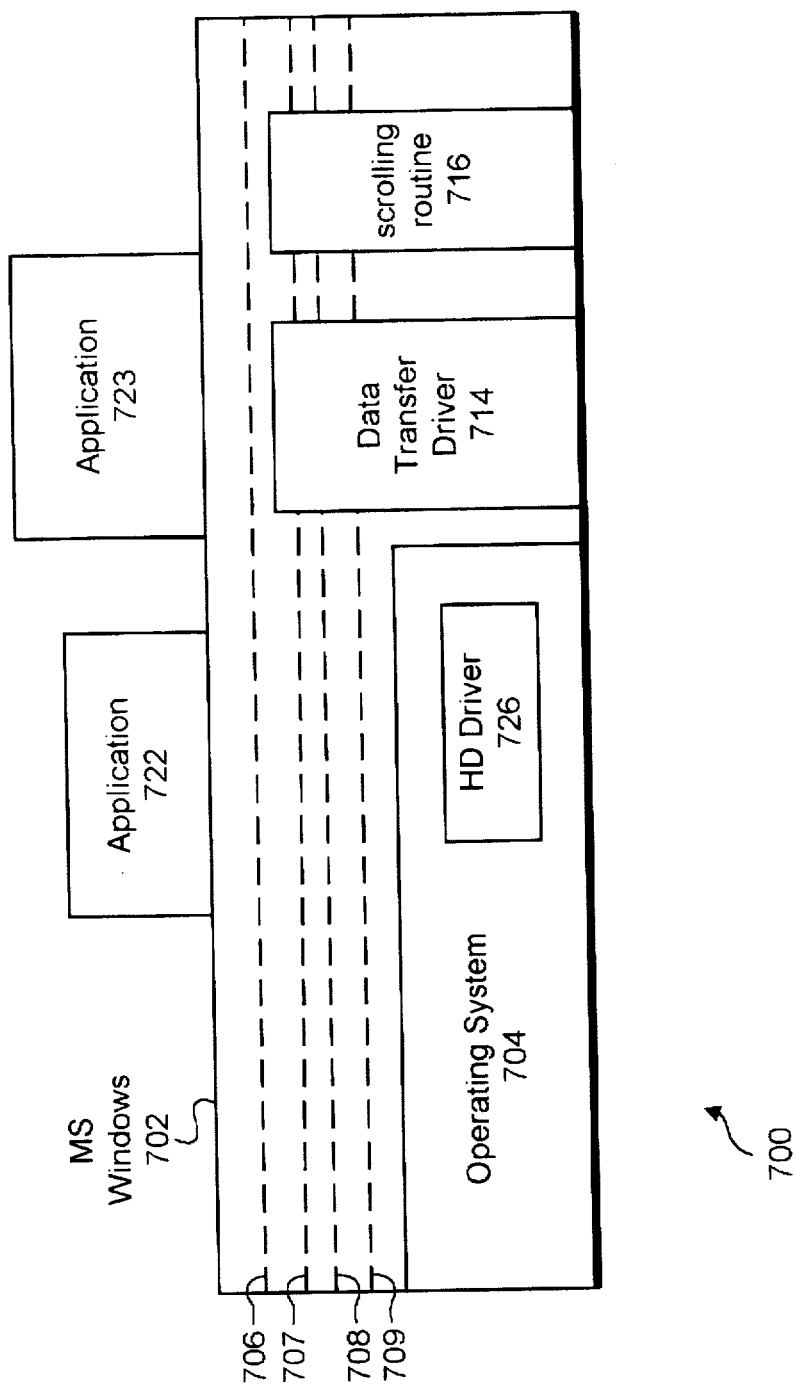
FIG. 3 is a schematic diagram of a software system of the present invention.

FIG. 3 is a schematic diagram of a software system 700 in a Microsoft MS Windows based environment executing on computer system 600. In this embodiment, computer system 600 is a IBM-compatible personal computer. Software system 700 comprises MS Windows 702 running on top of an operating system 704 (in this case, Microsoft's MS-DOS working in combination with the computer's "basic input/output system." or BIOS). Operating system 704 monitors and controls the resources of computer system 600. MS Windows is a complicated software containing many program modules and layers of procedure calls, shown schematically in FIG. 3 as dashed lines 706–709. Windows-based application programs 722 and 723 run on top of MS Windows 702.

Operating system 704 is a conventional software containing a conventional hard disk driver 726. The driver communicates with a conventional disk controller (not shown) and controls a conventional hard disk (not shown). It allows an application program to control and access the conventional hard disk. In the present implementation, the conventional hard disk is used to store operating system and application programs. Graphic data used in scrolling is stored in hard disk 638 of the present invention. Hard disk 638 and data transfer board 622 are controlled by a new data transfer driver 714 and scrolling is controlled by a new scrolling routine 716. Scrolling routine 716 uses the scrolling methods disclosed above in connection with FIGS. 2A–2E.

In the IBM compatible personal computer, a conventional hard disk driver is provided as a ROM based device service routine (DSR). This routine is part of the BIOS, which composes of an operating system, device drivers and shell. The hard disk DSR is accessed by invoking an INT 13 function. The DSR communicates with and controls an industrial standard hard disk controller. It allows an application program to perform many operations to the hard disk, including read, write, initialize, test, format, etc. It also returns status information (e.g., error codes) to the application program.

Many software applications use INT 13 for transferring data between a conventional hard disk and system RAM. However, this method leads to very slow data transferring. One of the reasons is that the CPU needs to spend many cycles in executing MS Windows codes, thus cannot drive the conventional hard disk to its maximum capability. Thus, the hard disk has to pause and wait for available CPU cycles during data transfer. As a result, the data transfer rate is slow. Another reason is that INT 13 and conventional hard disk interface require many CPU cycles to handle the transferring of data, thereby using valuable CPU resources for basic input/output operations. Thus, the application programs have to compete with the conventional DSR for CPU resources. As a result, the application programs run slowly. In order to improve data transfer between hard disk and the system RAM (or VRAM), the data transfer device of the present invention can be advantageously used in this system.

In the present implementation, it is desirable to minimize the interaction between data transfer driver 714 on one hand and MS Windows 702 and operation system 704 on the other hand. This is because the layers of Windows software could impose significant overhead in communication between the driver and the application programs. Thus, data transfer driver 714 and scrolling routine 716 should be written such that it can communicate with applications 722 and 723 through simple Windows messages. It is found that this arrangement improves execution speed because less overhead is required. In FIG. 3, data transfer driver 714 and scrolling routine 716 are shown schematically to be positioned below only dashed line 706. Thus, applications 722 and 723 can communicate with data transfer driver 714 and scrolling routine 716 without going through a long chain of MS Windows modules.

As explained in detail below, data transfer driver 714 take advantages of a novel design in data transfer board 622 so that the retrieval of data from hard disk 638 can take place simultaneously with the scrolling operation of the present invention. As a result, there is no need to compete for CPU resources.

Figure 4:
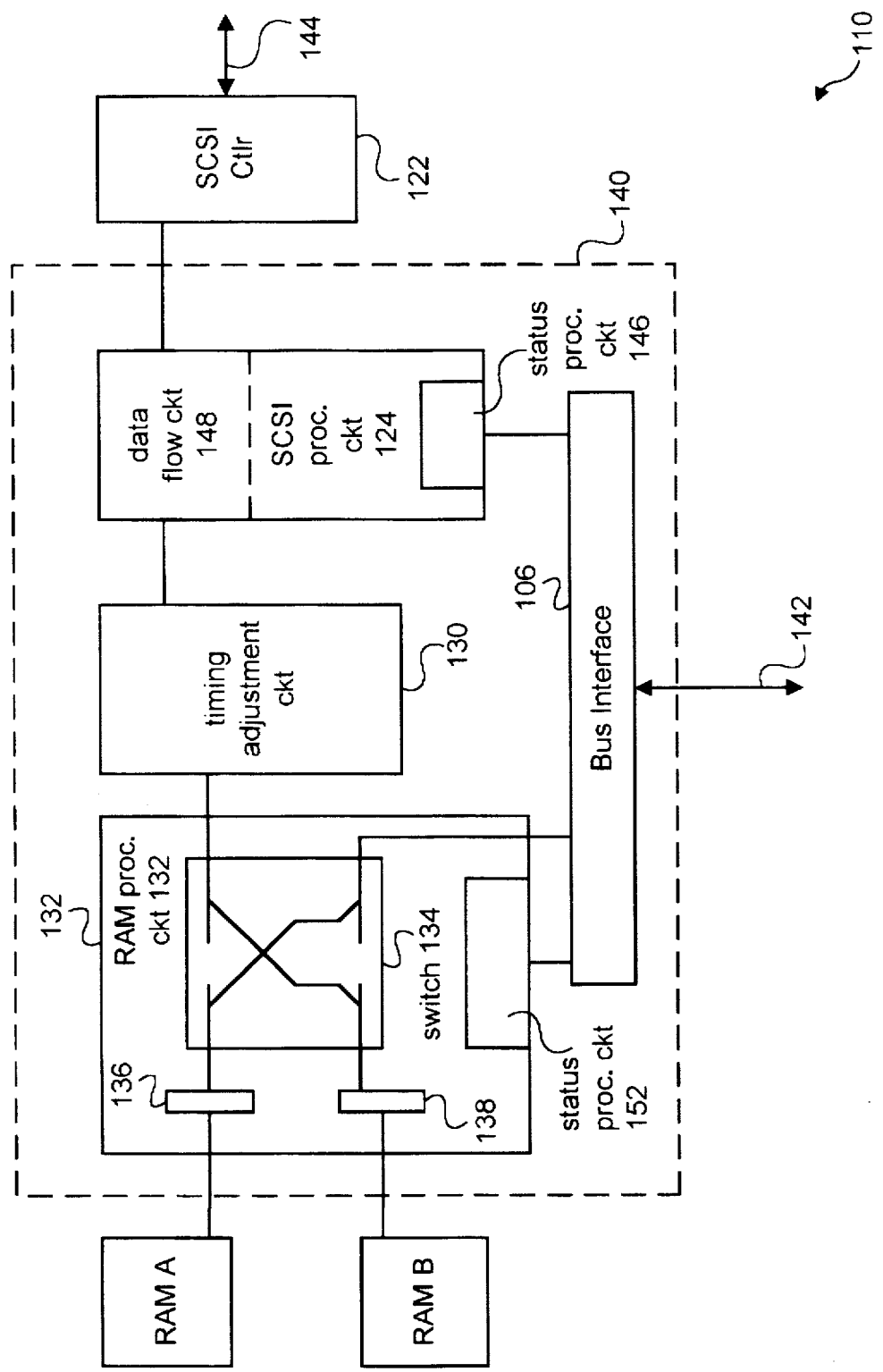
FIG. 4 is a block diagram of a data transfer device of the present invention.

FIG. 4 shows a block diagram of a data transfer device 110 of the present invention. In the present embodiment, device 110 is in the form of a peripheral board which could be used as data transfer board 622 of FIG. 1. However, device 110 could be fabricated on a single semiconductor chip and mounted on a mother board. Device 110 contains leads 142 and 144 which can be coupled to peripheral bus 614 and hard disk 638, respectively, of FIG. 1. Lead 142 is connected to a bus interface 106 for matching electrical signals between data transfer device 110 and the rest of computer system 600 of FIG. 1. Data transfer device 110 controls data transfer between hard disk 638 on one hand and system RAM 606 and/or VRAM 618 (referred to collectively as the "internal RAM") on the other hand.

Device 110 contains a "small computer system interface" (SCSI) controller 122, which communicates data and control information with hard disk 638 in the standard SCSI protocol. The design of such a controller is well known in the art and will not be discussed here. SCSI controller 122 is preferably in the form of a semiconductor chip.

SCSI controller 122 is connected to a SCSI processing circuit 124. SCSI processing circuit 124 is connected to bus interface 106 and a timing adjustment circuit 130. SCSI processing circuit 124 performs the following operations: (1) receives commands and status information from CPU 604 via bus interface 106; (2) controls hard disk 638 (through SCSI controller 122) in accordance with these commands and status information; (3) in cooperation with timing adjustment circuit 130, transfers data to and from a RAM processing circuit 132; and (4) sends status information to CPU 604 via bus interface 106. For example, SCSI processing circuit 124 can activate and deactivate the transfer of data to and from hard disk 638. The status signals generated by SCSI processing circuit 124 could be used by data transfer driver 714 which is designed to work with data transfer device 110.

In this embodiment of the present invention, hard disk 638 conforms to the SCSI standard. However, the present invention is equally applicable to hard disks conforming to other standards, e.g., IDE (integrated drive electronics) or EIDE (enhanced integrated drive electronics).

In the present invention, data is not directed transferred between hard disk 638 and the internal RAM of computer system 600. Instead, data is temporarily stored in a pair of random access memory devices inside data transfer device 110 (shown as RAM A and RAM B). Data transfer by RAM A and RAM B is fast. On the other hand, data transfer by hard disk 638 is typically slow and not synchronous to the data transfer of RAM A and RAM B. Timing adjustment circuit 130 serves to coordinate and synchronize the hard disk 638 and RAM A/RAM B data transfer.

In order to be able to achieve the above described functions, SCSI processing circuit 124 contains a status processing circuit 146 (for receiving, processing and generating status signals) and a data flow circuit 148 (for controlling the transfer of data to and from hard disk 638). The design of these circuits should be within the skill of persons skilled in circuit design art.

Timing adjustment circuit 130 is connected to a RAM processing circuit 132. This RAM processing circuit 132 is also connected, via bus interface 106, to CPU 604 and the internal RAM. In addition, RAM processing circuit 132 is connected to RAM A and RAM B inside data transfer device 110.

RAM processing circuit 132 comprises a switch 134 for connecting RAM A and RAM B on one hand to timing adjustment circuit 130 and bus interface 106 on the other hand. Specifically, if it is desirable to transfer data between SCSI processing circuit 124 to either RAM A or RAM B, switch 134 causes timing adjustment circuit 130 to be connected to the appropriate memory. Similarly, if it is desirable to transfer data between internal RAM to either RAM A or RAM B, switch 134 causes bus interface 106 to be connected to the appropriate memory device in data transfer device 110. It should be note that RAM A may be connected to either timing adjustment circuit 130 or bus interface 106 at a given time, but cannot be simultaneously connected to both timing adjustment circuit 130 and bus interface 106. Similarly, RAM B may be connected to either timing adjustment circuit 130 or bus interface 106 at a given time, but cannot be simultaneously connected to both timing adjustment circuit 130 and bus interface 106. Also, data cannot be directly transferred between timing adjustment circuit 130 and bus interface 106. The detailed operation of switch 134 in connection with the transfer of data will be described below.

In order to monitor the amount of data in RAM A and RAM B, RAM processing circuit 132 contains two byte processing unit. Each unit contains a counter and means for matching the electrical signal between RAM A or RAM B and RAM processing unit 132. These units will be referred to as counters 136 and 138. RAM processing circuit 132 monitors the transfer of data from/to RAM A and RAM B and decrement/increment the value of counters 136 and 138, respectively. As a result, the values of counters 136 and 138 provide an indication of the amount of data stored in RAM A and RAM B, respectively.

Another function of RAM processing circuit 132 is to receive commands and status information from CPU 604 via bus interface 106. RAM processing circuit 132 then controls the transfer of data between internal RAM on one hand and RAM A and RAM B on another hand in accordance with the received commands and status information. RAM processing circuit 132 may also send status signals to CPU 604. These signals could be used by data transfer driver 714. A status processing circuit 152 is included in RAM processing circuit 132 to perform these functions.

Because it is desirable to optimize the access time of RAM A and RAM B, static RAMs are preferably used. However, other types of RAMs (such as dynamic RAM) could be used, and the present invention is not limited to a specific type of RAM.

The transfer of data between internal RAM on one hand and RAM A and RAM B on the other hand can be handled by CPU 604 directly (e.g., by issuing data transfer instructions to the CPU) or via conventional direct memory access (DMA). For processors which lack powerful data transfer instructions, such transfer is most efficiently handled by DMA. For processors which have powerful data transfer operations (e.g., burst mode transfer and string transfer instructions), such transfer is most efficiently handled by the CPU itself.

In one embodiment of the present invention, SCSI processing circuit 124, RAM processing circuit 132, timing adjustment circuit 130, and bus interface 106 are fabricated on a single semiconductor chip 140.

Figure 5:
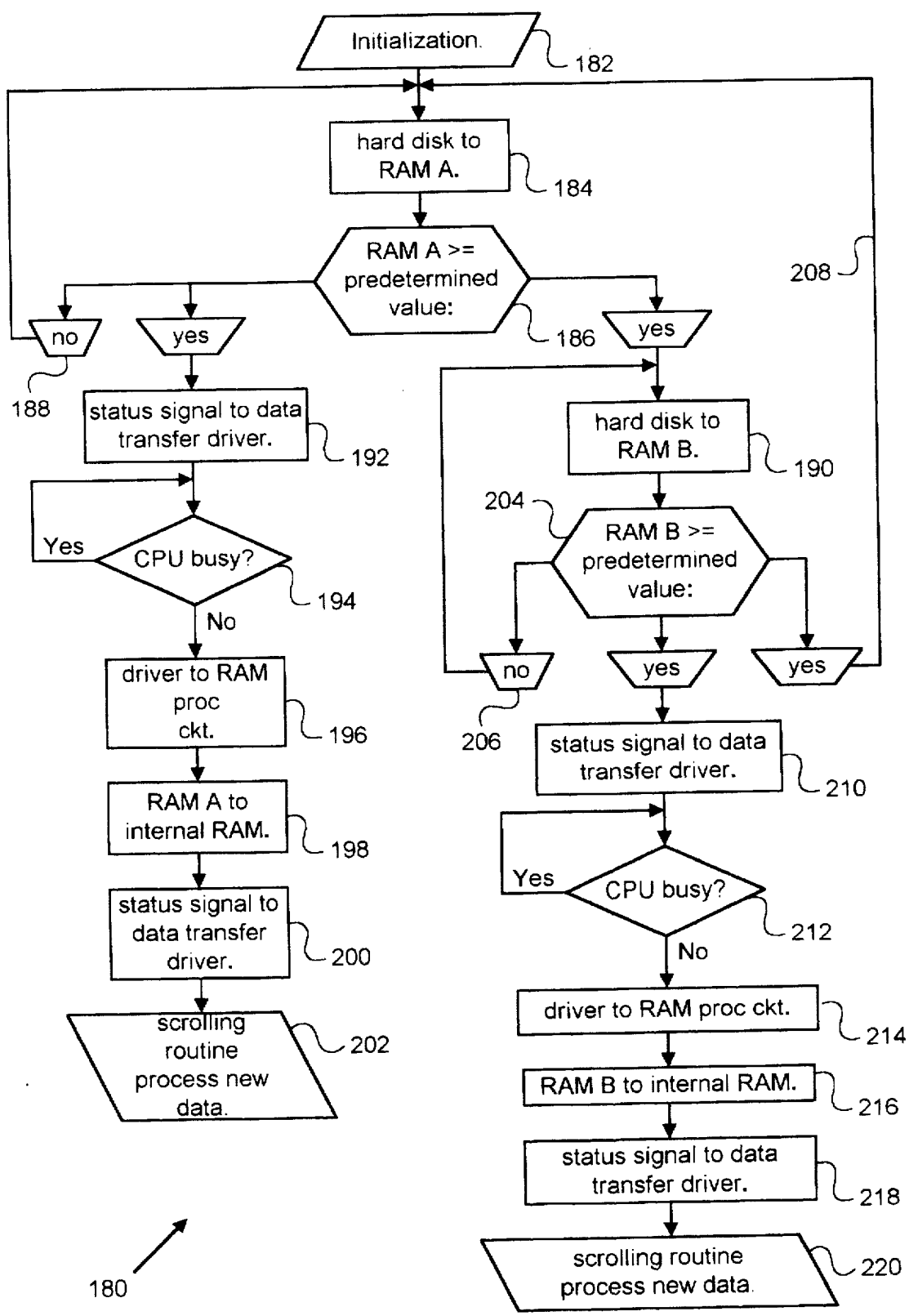
FIG. 5 is a flow chart showing the operation of the data transfer device of the present invention.

In the present invention, data transfer board 622, data transfer driver 714, and scrolling routine 716 act in a cooperative manner to achieve fast data transfer and scrolling. In a first example in accordance with the present invention, an application software, such as application 722, issues instructions to data transfer driver 714 to retrieve a certain amount of graphic data from hard disk 638 and load to the internal RAM. The newly loaded data will be used for scrolling by scrolling routine 716. A flow chart 180 in FIG. 5 is used in connection with this example. Data transfer driver 714 issues an initialization command to SCSI processing circuit 124 and RAM processing circuit 132 (step 182). SCSI processing circuit 124 then initializes (through SCSI controller 122) hard disk 638 so that it is ready to retrieve and transfer data. RAM processing circuit 132 sets the values of counters 136 and 138 to zero and sets switch 134 to connect timing adjustment circuit 130 to RAM A. RAM processing circuit 132 retrieves data from SCSI processing circuit 124 (after processing by timing adjustment circuit 130) and transfers same to RAM A. As a result, data is read from hard disk 638 and loaded into RAM A (step 184).

During step 184, CPU 604 is not involved. Thus, it can perform other functions, including executing scrolling routine 716.

RAM processing circuit 132 uses counter 136 to determine whether the amount of data in RAM A has reached a predetermined value (step 186). If this value is not reached (i.e., RAM A has room to accept additional data), data from SCSI processing circuit 124 (and hard disk 638) continues to flow to RAM A (step 188), after processing by timing adjustment circuit 130. When RAM A is not able to accept data, RAM processing circuit 132 causes switch 134 to connect timing adjustment circuit 130 to RAM B. As a result, data is read from hard disk 638 and loaded into RAM B (step 190). At this time, RAM processing circuit 132 sends a status signal (e.g., an interrupt) to data transfer driver 714 informing it that data in RAM A can be transferred to internal RAM (step 192). In step 194, data transfer driver 714 then determines whether CPU 604 is busy (i.e., not ready to transfer data). If CPU 604 is busy in performing other tasks (including executing scrolling routine 716), data transfer driver 714 will wait. If CPU 604 is available for processing data, data transfer driver 716 sends a command to RAM processing circuit 132, which causes switch 134 to connect bus interface 106 to RAM A (step 196). At this time, data can be transfer from RAM A to internal RAM (step 198). Note that the above described step 190 (i.e., transfer data from hard disk 638 to RAM B) can be performed simultaneously with steps 192 to 198. Typically, the time for performing step 190 is longer than the time for performing steps 192–198. RAM processing circuit 132 can send a status signal to data transfer driver 714 when step 198 (i.e., from RAM A to internal RAM) is completed (step 200). Data transfer driver 714 can issue a command to scrolling routine 716 to process the new data loaded into internal RAM (step 202).

RAM processing circuit 132 uses counter 138 to determine whether the amount of data in RAM B has reached a predetermined value (step 204). If this value is not reached (i.e., RAM B has room to accept data), data continues to be loaded into RAM B from hard disk 638 (step 206). When RAM B is not able to accept data, RAM processing circuit 132 causes switch 134 to connect timing adjustment circuit 130 to RAM A again. Flow chart 180 branches back to step 184 via path 208, and the above described steps regarding transferring of data to RAM A will be performed. At the same time, RAM processing circuit 132 sends a status signal to data transfer driver 714 informing it that data in RAM B can be transferred to internal RAM (step 210). In step 212, data transfer driver 714 then determines whether CPU 604 is busy (i.e., cannot transfer data out of RAM B). If CPU 604 is busy in performing other tasks (including executing scrolling routine 716), data transfer driver 714 will wait. If CPU 604 is available, data transfer driver 714 sends a command to RAM processing circuit 132, which causes switch 134 to connect bus interface 106 to RAM B (step 214). As a result, the data stored in RAM B can be transferred to internal RAM (step 216). As pointed out before, steps 210–216 could occur simultaneously with the transferring of data from hard disk 638 to RAM A (i.e., step 184). Typically, the time for transferring data from hard disk 638 to RAM A is longer than the time for performing steps 210–216. Upon completing step 216, RAM processing circuit 132 can send a status signal to data transfer driver 714 (step 218), which then issues a command to scrolling routine 716 to process the new data loaded into internal RAM (step 220).

The application programs (through data transfer driver 714) determine the amount of data to be transferred from hard disk 638 to internal RAM. The above described cycles continue until all the required data is transferred to internal RAM.

Typically, the time to transfer data stored in RAM A and RAM B to internal RAM is very short when compared to the disk data transferring time. Thus, RAM A and RAM B are always available for disk data transferring because the data stored therein should have already been transferred to internal RAM. If both RAM A and RAM B are not available for disk data transfer, data transfer driver 714 should delay disk transferring operation until one of them is available.

Figure 6:
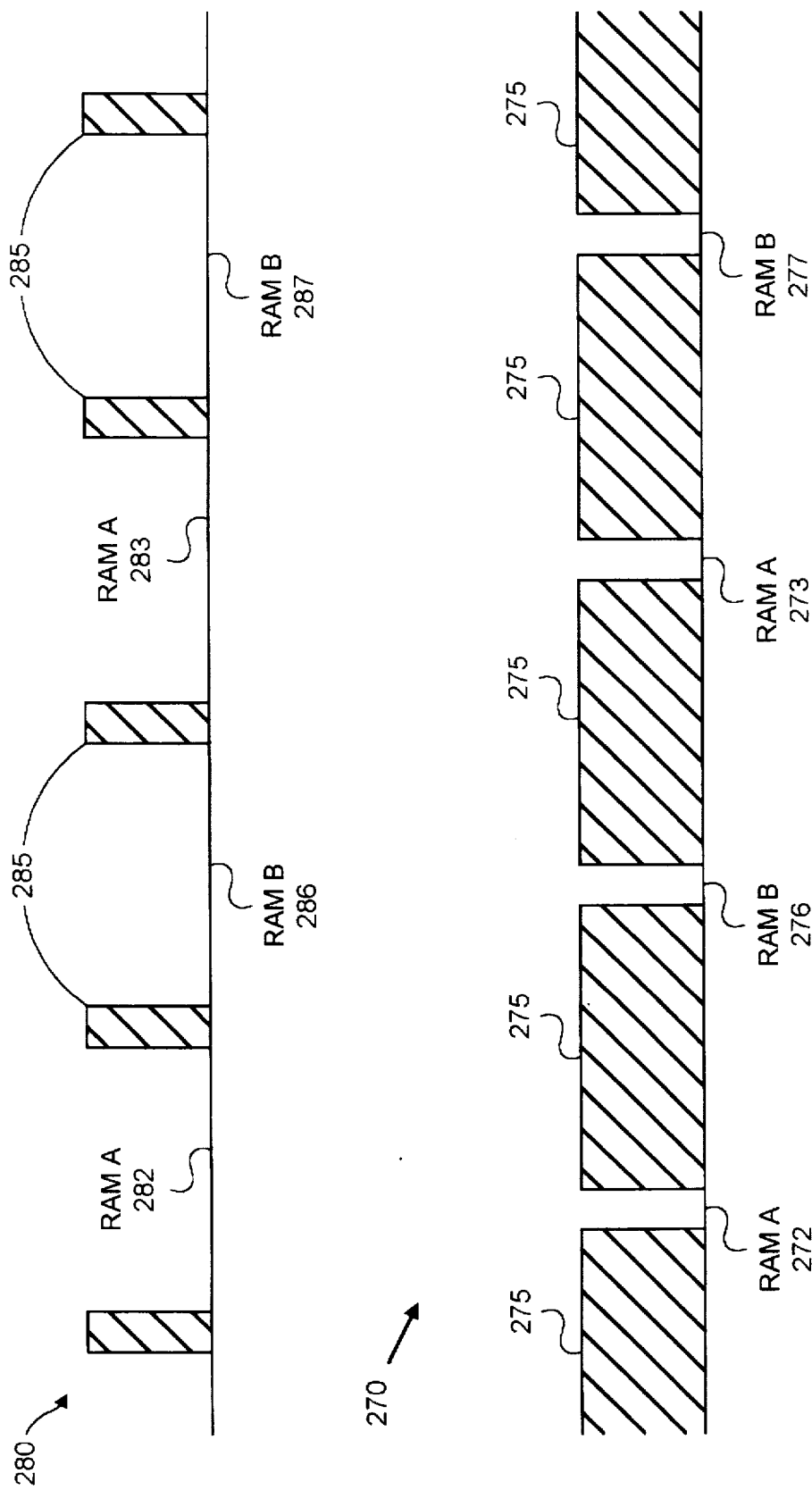
FIG. 6 is a timing diagram showing the relative timing between SCSI cycles and internal memory cycles of the data transfer device of FIG. 4.

FIG. 6 shows the relative timing between SCSI cycles and internal memory cycles of data transfer device 110 in FIG. 4. Timing diagram 280 shows the transfer of data between hard disk 638 and RAM A/RAM B. In FIG. 6, reference numerals 282 and 283 correspond to time intervals for transferring data between hard disk 638 and RAM A while reference numerals 286 and 287 correspond to time intervals for transferring data between hard disk 638 and RAM B. Time intervals for switching between RAM A and RAM B, designated as reference numeral 285, are much shorter than the time intervals for transferring data. This is because the switching is performed electronically using semiconductor elements in RAM processing circuit 132.

Timing diagram 270 shows the transfer of data between internal RAM and RAM A/RAM B. In FIG. 6, reference numerals 272 and 273 correspond to time intervals for transferring data between internal RAM and RAM A while reference numerals 276 and 277 correspond to time intervals for transferring data between internal RAM and RAM B. Note that the time intervals 272, 273, 276, and 277 (for internal RAM transferring) are much shorter than time intervals 282, 283, 286 and 287 (for hard disk transferring). As pointed out above, computer system 600 can perform other functions (e.g., scrolling and other operations) during time intervals 282, 283, 286 and 287 for hard disk transferring. In effect, the scrolling operation and transfer of data from hard disk 638 are performed in parallel. As a result, the throughput of computer system 600 is much higher than conventional systems.

It should be noted that RAM A and RAM B are not cache memory. Thus, there is no need to include circuit for detecting hits and misses and for replacing a portion of the memory in accordance with the frequency of hits. The circuit of the present invention is simple and fast.

There are prior art systems which use buffers for the purpose of speeding up disk transfer. For example, many hard disks use semiconductor memory as buffers to improve throughput. Some computer systems use a portion of their system memory as buffers. However, these systems do not use the RAM A/RAM B architecture and the coordination between software (data transfer driver 714 and scrolling routine 716) and hardware. Consequently, their performance is inferior to the performance of the system of the present invention.

Additional Implementation Details

The following description contains additional details to allow persons skilled in the art to more efficiently implement the scrolling methods of the present invention.

As mentioned above, the graphic data is stored in hard disk 638 and needs to be loaded into VRAM 618 so that it can be displayed on monitor 630. If the graphic data is retrieved from hard disk 638 and loaded into VRAM 618 every time an image is updated as a result of scrolling, this could cause excessive amount of disk access. In one embodiment of the present invention, a portion of system RAM 606 is used to temporarily store a portion of the graphic data. If the size of the portion in system RAM 606 is larger than the size of VRAM 618, the new image could be constructed from the graphic data in system RAM 606 if the amount of scrolling is small. In this case, hard disk 638 does not have to be accessed.

Figure 7:
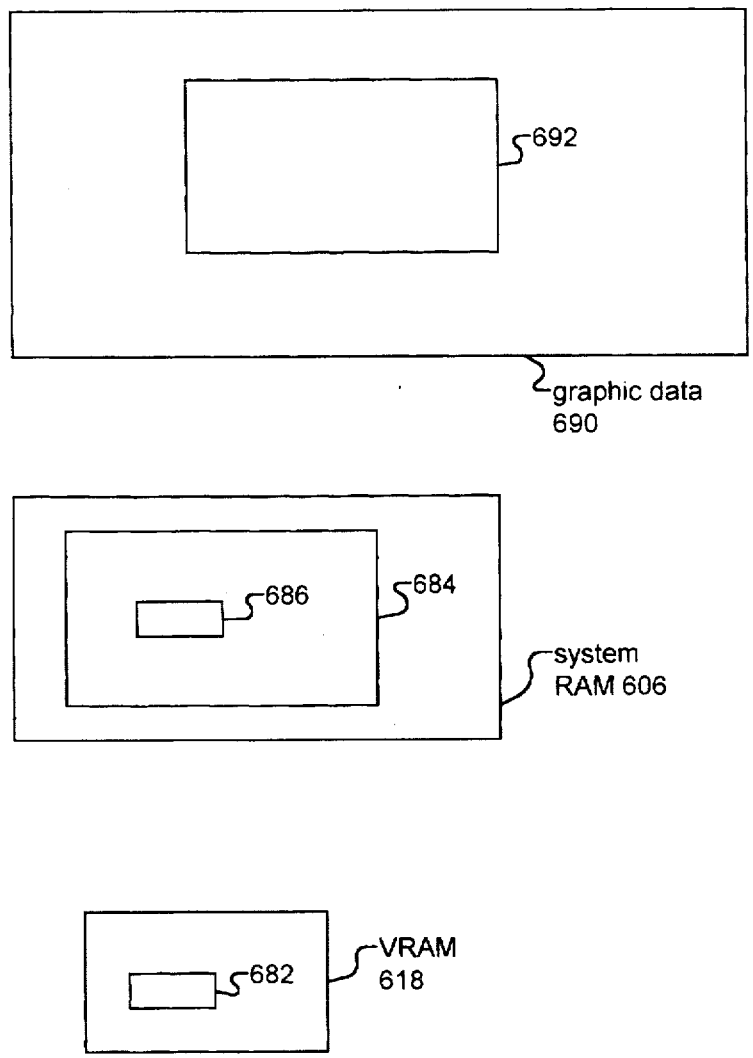
FIG. 7 is a schematic diagram showing the relationship between graphic data in VRAM, system RAM, and a hard disk of the present invention.

FIG. 7 shows the relationship between the graphic data in VRAM 618, system RAM 606 and the hard disk 638. Components that are the same in FIGS. 1 and 7 are designated by the same reference numerals. The size of VRAM 618 is about 1 megabyte. A portion 682 of VRAM 618 is devoted to window 632. Thus, portion 682 contains graphic data that is associated with the image displayed in window 632. The recommended size of system RAM 606 for computer capable of running Microsoft's Windows environment is more than 8 megabytes. Many computer users install more than 16 megabytes of RAM in their system. Even though part of system RAM 606 is used for other purposes, the size of system RAM 606 available for storing graphic data can be more than the size of portion 682.

In FIG. 7, a portion 684 of system RAM 606 is used to temporarily store the graphic data. A portion 686 inside portion 684 contains graphic data corresponding to the graphic data contained in portion 682 of VRAM 618.

The graphic data for the complete image is shown in FIG. 7 as numeral 690. It is preferably stored as a file in hard disk 638. Hard disk 638 may contain many sets of graphic data, each corresponding to a different image. A portion 692 of graphic data inside data 690 corresponds to the graphic data contained in portion 684 in system RAM 606.

Because portion 682 of VRAM 618 (and consequently portion 686 of system RAM 606) is much smaller than portion 684 of system RAM 606, it is possible to scroll in window 632 without accessing hard disk 638 if the graphic data corresponding to the new image is stored in portion 684.

The transfer of graphic data between system RAM and VRAM is quite fast because the overhead in hardware and software for transferring data between VRAM and RAM is quite low. However, the transfer of data between a hard disk and system RAM is comparatively slow. Thus, it is possible to improve performance by using system RAM as an intermediary memory.

The invention has been described with reference to a specific exemplary embodiment thereof Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A method for scrolling an image of a vector graphic file in response to positions of a cursor, said image being generated from data loaded into an area of a semiconductor memory device related to a display device, said scrolling involving display a first image containing a first portion of said graphic file at a first time and a second image containing a second portion of said graphic file at a second time, said image comprising a plurality of shapes each associated with a vector command of said vector graphic file, said method comprising the steps of:

(a) providing said vector graphic file with at least one vector command for one of said shapes, said vector command containing parameters obtained from the following steps:
  (i) determining a set of coordinate data corresponding to a polygon enclosing said one shape; and
  (ii) including said set of coordinate data in said at least one vector command; and (b) performing scrolling operation using said set of coordinate data by performing the following steps:
  (i) determining a new portion of said graphic file which needs to be loaded to said area of said memory device in order to generate said second image, said new portion being a function of said positions of said cursor;
  (ii) determining by using said set of coordinate data whether a portion of said polygon falls within said new portion of said graphic file; and
  (iii) expanding said at least one vector command only if said portion of said polygon falls with said new portion.

2. The method of claim 1 wherein said step of performing scrolling operation further comprising the steps of:

(i) finding a common portion of said graphic file which is common to said first portion and said second portion, said common portion being located in a first region of said area of said memory device at said first time; and (ii) moving said common portion from said first region to a second region in said area of said semiconductor memory device, the location of said second region being determined by said cursor; and (iii) loading at least a portion of said one shape expanded from said at least one vector command into said area of semiconductor device;

said finding, moving and loading steps being completed prior to said second time.

3. A method for scrolling an image of a graphic file in response to positions of a cursor, said image being generated from data loaded into an area of a semiconductor memory device related to a display device, said scrolling involving display a first image containing a first portion of said graphic file at a first time and a second image containing a second portion of said graphic file at a second time, said method comprising the steps of:

(a) determining a common portion of said graphic file which is common to said first portion and said second portion, said common portion being located in a first region within said area of said semiconductor memory device at said first time;

(b) moving said common portion from said first region to a second region inside said area of said semiconductor memory device, the location of said second region being determined by said cursor;

(c) determining a new portion of said graphic file which is in said second portion but not in said first portion of said graphic file; and (d) loading said new portion to a third region of said semiconductor memory device such that said second and said third regions occupy said area of said semiconductor memory device;

said steps (a), (b), (c) and (d) being executed prior to said second time.

4. The method of claim 3 wherein said graphic file is stored in a hard disk and said semiconductor memory device comprises a display memory, said loading step comprising the steps of:

retrieving said new portion from said hard disk to system random access memory; and transferring said new portion from said system random access memory to said display memory.

5. The method of claim 3 wherein said image comprises a superposition of a bitmap image and a vector image, said graphic file contains a bitmap file and a vector file, said vector image comprising a plurality of shapes each associated with a vector command, said method further comprising the steps of:

(a) providing said vector file with at least one vector command for one of said shapes, said vector command containing parameters obtained from the following steps:
  (i) determining a set of coordinate data corresponding to a polygon enclosing said one shape; and
  (ii) including said set of coordinate data in said at least one vector command; and (b) performing scrolling operation using said set of coordinate data by performing the following steps:
  (i) determining a new portion of said vector file which needs to be loaded to said area of said memory device in order to generate said second image, said new portion being a function of said positions of said cursor;
  (ii) determining by using said set of coordinate data whether a portion of said polygon falls within said new portion of said vector file; and
  (iii) expanding said at least one vector command only if said portion of said polygon falls with said new portion.

6. A system for fast scrolling of an image of a graphic file in response to positions of a cursor, said graphic file being stored in an external memory device, said image being generated from data loaded into an area of a semiconductor memory device related to a display device, said scrolling involving displaying a first image containing a first portion of said graphic file at a first time and a second image containing a second portion of said graphic file at a second time, said system comprising:

a dual memory storage device comprising:
  a retrieval circuit for retrieving graphic data in said graphic file from said external storage device;
  a first memory device;
  a second memory device;
  an interface circuit for allowing data stored in said first and said second memory devices to be output from said dual memory device;
  a first circuit for alternatively switching said retrieval circuit to said first memory device and said second memory device for allowing said graphic data to store in said first and said second memory devices, and for alternatively switching said interface circuit to said first memory device and said second memory device; and
  a second circuit for generating status signals upon said switching; and a software module comprising:
  means for determining a common portion of said graphic file which is common to said first portion and said second portion, said common portion being located in a first region of said semiconductor memory device at said first time;
  means for moving said common portion from said first region to a second region in said area of said semiconductor memory device, the location of said second region being determined by said cursor;
  means for determining a new portion of said graphic file which is in said second portion but not in said first portion of said graphic file;
  means for causing said dual memory storage device to retrieve said new portion from said external storage device; and
  means, responsible to said status signals for causing said retrieved new portion to be loaded into a third region of said semiconductor memory device prior to said second time, said second and said third regions occupying said area of said semiconductor memory device.

7. The dual memory storage device of claim 6 wherein said first circuit comprising:

a first counter coupled to said first memory device for determining an amount of data stored in said first memory device;

a second counter coupled to said second memory device for determining an amount of data stored in said second memory device;

means for generating a first signal when the amount of data stored in said first memory device exceeds a first predetermined value;

means for generating a second signal when the amount of data stored in said second memory device exceeds a second predetermined value;

a third circuit for communicating data with said retrieval circuit;

a fourth circuit for communicating data with said interface circuit; and a data switching circuit for alternatively coupling said first memory device to one of said third and said fourth circuits in response to said first signal and for alternatively coupling said second memory device to one of said third and said fourth circuits in response to said second signal.

* * * * *